United States Patent [19]

Maslak

[11] Patent Number: 4,928,478
[45] Date of Patent: May 29, 1990

[54] WATER AND STEAM INJECTION IN COGENERATION SYSTEM

[75] Inventor: Chris E. Maslak, Ballston Lake, N.Y.

[73] Assignee: General Electric Company, Schenectady, N.Y.

[21] Appl. No.: 757,177

[22] Filed: Jul. 22, 1985

[51] Int. Cl.$^5$ ............................................. F02C 7/00
[52] U.S. Cl. ................................. 60/39.05; 60/39.3; 60/39.53; 60/39.55
[58] Field of Search .................. 60/39.26, 39.3, 39.24, 60/39.55, 39.53, 39.05, 39.182, 728

[56] References Cited

U.S. PATENT DOCUMENTS

| 3,693,347 | 9/1972 | Kydd et al. | 60/39.3 |
| 3,708,976 | 1/1973 | Berlyn | 60/39.55 |
| 3,731,485 | 5/1973 | Rudolph et al. | 60/39.53 |
| 4,259,837 | 4/1981 | Russell et al. | 60/39.55 |
| 4,466,241 | 8/1984 | Inui et al. | |
| 4,519,207 | 5/1985 | Okabe et al. | |

FOREIGN PATENT DOCUMENTS

| 1007140 | 5/1952 | France | 60/39.53 |
| 1168070 | of 1958 | France | |
| 38808 | 4/1978 | Japan | 60/39.55 |
| 35108 | 3/1980 | Japan | 60/39.55 |
| 59-77041 | of 1984 | Japan | |
| 82531 | 5/1984 | Japan | 60/39.55 |
| 243692 | 1/1947 | Switzerland | 60/39.53 |

*Primary Examiner*—Donald E. Stout
*Attorney, Agent, or Firm*—Nixon & Vanderhye

[57] ABSTRACT

A control system for a cogeneration plant measures the flow of steam exceeding the requirements of the steam-using process. Water is injected into the combustion zone of a combustor of the gas turbine portion of the cogeneration system to provide a predetermined reduction in NOx products. The excess steam is added to the output of the compressor portion of the gas turbine to augment the gas turbine power output due to the augmented mass flow. The control system reduces the water injection in proportion to the steam flow to maintain the total water flow to the combustion zone at a level which maintains the preferred level of NOx reduction. In a second embodiment, the excess steam is first injected into the combustion zone with a one-for-one equivalent reduction in water injection. When the excess steam exceeds the amount required for NOx reduction, the excess is added to the output of the air compressor for power augmentation. As the power augmentation steam is added a proportionate reduction is made in the NOx reduction steam to account for the fact that a fraction of the output of the air compressor passes through the combustion zone.

6 Claims, 7 Drawing Sheets

4,928,478

WATER AND STEAM INJECTION IN COGENERATION SYSTEM

BACKGROUND OF THE INVENTION

The present invention relates to thermodynamic conversion systems and, more particularly, to thermodynamic conversion systems employing large gas turbines. The invention is especially adapted to a cogeneration system in which a gas turbine produces an output torque and a large quantity of hot exhaust gasses. The energy in the hot exhaust gasses is captured in an associated heat recovery steam generator.

A cogeneration system typically uses the torque output of the gas turbine for generating electric power or for some other consuming process. Steam generated by the heat recovery steam generator may be applied to an auxiliary steam turbine for generating additional torque, or applied to a using process which is capable of direct use of the steam without intermediate conversion to torque. The total output of a cogeneration system offers an attractive thermodynamic conversion efficiency.

As is well known, improved efficiency in an internal combustion engine, including a gas turbine engine, is attained with lean fuel-air mixtures at elevated combustion temperatures. Unfortunately, elevated combustion temperatures increase the production of NOx compounds in the exhaust. The desire to improve efficiency thus comes into conflict with the desire to reduce NOx compounds in the exhaust. Government regulations increasingly place more stringent limits on the amount of NOx which an internal combustion engine is permitted to emit into the atmosphere.

NOx emissions can be reduced by brute-force methods such as, for example, reacting the exhaust with a catalyst or adding additional chemicals to the exhaust stream to react the NOx components into chemical compounds which are more easily removed from the exhaust stream before it exits the stack. Catalytic reaction and chemical addition both require additional structure and operating expense to support.

It is conventional to employ water or steam injection into the combustion zone of a gas turbine combustor to reduce the reaction temperature and thereby to reduce NOx emission.

It is also conventional to inject excess steam, which may not otherwise be needed in the using process of a cogeneration system, into the output of the compressor of the gas turbine engine. The mass flow added to the output of the compressor augments the power produced by the turbine portion of the gas turbine engine. A portion of the steam thus injected into the output of the compressor for power augmentation enters the combustion zone of the combustor. This steam also reduces the combustion reaction temperature and thereby the NOx emissions.

OBJECTS AND SUMMARY OF THE INVENTION

Accordingly, it is an object of the invention to provide a cogeneration system in which coordinated use of excess steam and water injection provides a predetermined reduction in NOx emissions together with a maximum increase in output power from the gas turbine portion of the cogeneration system.

It is a further object of the invention to provide a cogeneration system in which an excess steam flow is blended with an output of a compressor of a gas turbine.

An amount of water injected into the combustion zone of a combustor of the gas turbine engine is modulated to produce a total water flow to the combustion zone which is appropriate for maintaining a predetermined value of NOx emission reduction.

It is a still further object of the invention to provide a cogeneration system in which injection of a first excess of steam flow into a combustor is substituted for the injection of a water flow into the combustor of a gas turbine engine of the cogeneration system. The amount of steam substituted for the water maintains a predetermined reduction in NOx emissions. Once the available excess steam exceeds the total steam requirements for NOx reduction, a further excess steam is applied as power augmentation steam to the output of the compressor. As the further excess steam is added to the output of the compressor, the NOx reduction steam injected into the combustor zone is reduced to compensate for the fraction of the power augmentarion steam which enters the combustion zone.

Briefly stated, the present invention provides a control system for a cogeneration system which measures the flow of steam exceeding the requirements of the steam-using process. Water is injected into a combustion zone of a combustor within a gas turbine portion of the cogeneration system to provide a predetermined reduction in NOx compounds. The excess steam is added to an output of the compressor portion of the gas turbine to augment the gas turbine power output due to the augmented mass flow. The control system reduces the water injection in proportion to the steam flow to maintain the total water flow to the combustion zone at a level which maintains the preferred level of NOx reduction. In a second embodiment, the excess steam is first injected into the combustion zone with a one-for-one equivalent reduction in water injection. When the excess steam exceeds the amount required for NOx reduction, the excess is added to the output of the air compressor for power augmentation. As the power augmentation steam is added, a proportionate reduction is made in the NOx reduction steam to account for water content in a fraction of the output of the air compressor which passes through the combustion zone.

According to an embodiment of the invention, there is provided a cogeneration system comprising the cogeneration system being of a type having a gas turbine consisting of an air compressor, a combustor and a turbine effective for producing an output torque and a flow of hot gasses, and a heat recovery steam generator effective for absorbing heat energy from the hot gasses and for producing steam, means for injecting at least one of a steam and a water into a combustion zone of the combustor at a flow effective for producing a predetermined level of reduction in a NOx in the hot gasses, means for adding at least part of an excess steam from the heat recovery steam generator to compressed air from the air compressor whereby power output of the gas turbine is augmented and means for reducing the at least one of a steam and a water in a proportion to the excess steam added to the compressed air effective to maintain the predetermined level of reduction in a NOx in the hot gasses.

According to a feature of the invention, there is provided a method for controlling a cogeneration system of a type including a gas turbine and a heat recovery steam generator, the gas turbine including an air compressor, a combustor and a turbine effective, in combination for producing a torque, and a quantity of hot gasses, the heat recovery steam generator being effective to absorb heat energy from the hot gasses for producing steam, the method comprising injecting at least one of a steam and a water into a combustion zone of the combustor at a flow effective for producing a predetermined level of reduction in a NOx in the hot gasses, adding at least part of an excess steam from the heat recovery steam generator to compressed air from the air compressor whereby power output of the gas turbine is augmented and reducing the at least one of a steam and a water in a proportion to the excess steam added to the compressed air effective to maintain the predetermined level of reduction in a NOx in the hot gasses.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

The following description equates the combustion cooling properties of steam and water. This is not precisely correct since the water is capable of absorbing more heat per pound than steam in its heat of vaporization and in the additional heating it requires to attain the same temperature as the injected steam. The embodiments of the invention take these differences into account by applying a bias factor in the calculation of the relationships between steam and water flows. For purposes of description, however, it is convenient to make the simplifying assumption of direct equivalence between equal masses of water and steam.

Figure 1:
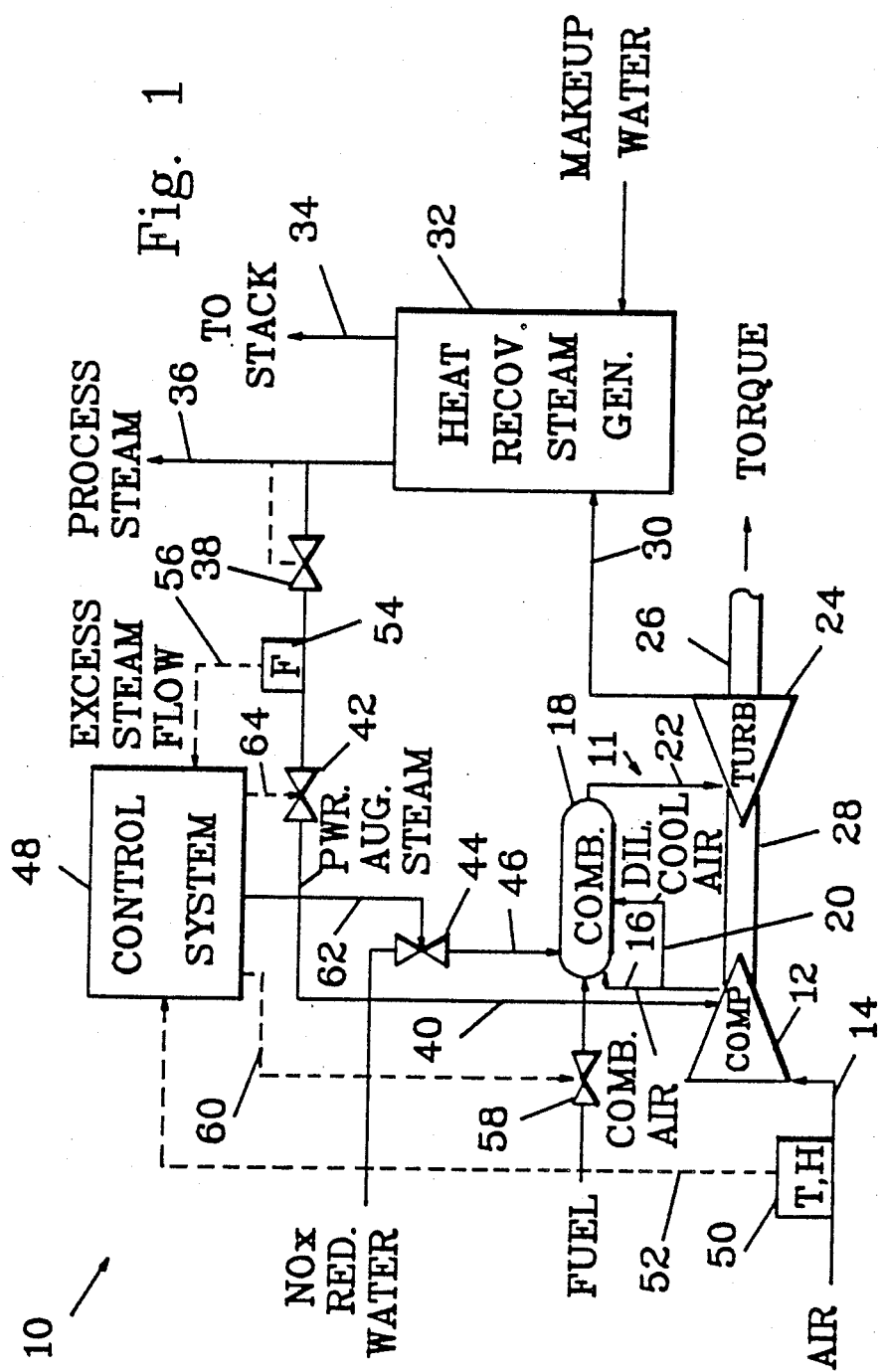
FIG. 1 is a simplified block and schematic diagram of a cogeneration system according to an embodiment of the invention.

Referring now to FIG. 1, there is shown, generally at 10, a cogeneration system according to an embodiment of the invention. A gas turbine 11 includes an air compressor 12 effective to compress ambient air entering on an air inlet line 14. Part of the compressed air is connected on a combustion air line 16 to a combustion zone of a combustor 18. The remainder of the compressed air from air compressor 12 is applied to combustor 18 on an air dilution and cooling line 20. The air on air dilution and cooling line 20 bypasses the combustion reaction in combustor 18 and, instead, is employed for reducing the temperatures of hot gasses and increasing the mass-flow rate of the hot gasses in a combustor exhaust line 22 which are applied to a turbine 24. The energetic hot gasses entering turbine 24 rotate an output shaft 26 for producing output torque. The hot gasses also rotate an intershaft 28 for driving air compressor 12.

After expanding in turbine 24, the hot gasses, although now considerably reduced in temperature and pressure, nevertheless still contain a substantial amount of unrecovered energy. Therefore, the exhaust gasses from turbine 24 are conducted on an exhaust line 30 to a heat recovery steam generator 32 wherein the hot exhaust gasses pass over tubes containing cooler water into which their heat is absorbed to produce steam. The cooled exhaust gasses are then conducted to a stack 34 for dispersion in the ambient air.

The steam generated in heat recovery steam generator 32 is applied to a using process on a process steam line 36. The nature of the using process is not of concern to the present invention. In many cogeneration systems, the economic need for output torque on output shaft 26 is at a different level than the need for process steam on process steam line 36. That is, if the amount of hot gasses produced to generate the required torque are capable of generating more or less steam in heat recovery steam generator 32 than can be used by the using process, an imbalance exists between the parts of the system.

If an insufficiency of process steam is produced, auxiliary burners (not shown) may be employed in heat recovery steam generator 32 to increase the amount of process steam generated in heat recovery steam generator 32.

If an excess of process steam is produced, the excess process steam may be discharged to the atmosphere. Discharging the excess steam is undesirable from the standpoints of thermodynamic efficiency and the impression of the negative cosmetic effect that a steam plume has on the neighbors of the system.

One measure of the sufficiency of the amount of process steam on process steam line 36 is the pressure in process steam line 36. When the pressure therein exceeds a value indicating that an excess of process steam is available, a pressure controlled valve 38 opens to admit the excess steam to a power augmentation steam line 40. The excess steam flowing through power augmentation steam line 40 is blended with the compressed air from air compressor 12 which flows through combustion air line 16 and air dilution and cooling line 20 to combustor 18. A flow-limiting valve 42 is actuated in a manner to be described to prevent a flow of steam through power augmentation steam line 40 in a volume which is capable of exceeding the liquid limit of the combustion zone of combustor 18.

A NOx reduction water control valve 44 controls a flow of water through a water injection line 46 leading to the combustion zone of combustor 18 at a rate effective to produce a predetermined reduction in NOx emissions. For a given fuel flow to combustor 18, the total amount of water, or the water-equivalent of steam, which can be injected into combustor 18 is limited by flame blowout, dynamic pressure pulsations. The total amount of water entering the combustion zone includes the water from water injection line 46 and the water equivalent of that portion of the steam entering air compressor 12 from power augmentation steam line 40 which ultimately flows through combustion air line 16 into the combustion zone of combustor 18. The portion of the injected steam flowing in air dilution and cooling line 20 bypasses the combustion zone and therefore need not enter the calculation of maximum water entering the combustion zone. Although the exact division differs from machine to machine, and may also differ with different operating conditions in a single machine, the combustion air flowing in combustion air line 16 is typically about one third of the total effluent from air compressor 12. It thus is seen that a pound of water flowing in NOx reduction water control valve 44 has about three times more influence on the combustion zone than a pound of steam flowing in power augmentation steam line 40.

A control system 48 receives signals representative of the temperature and specific humidity of the air in air inlet line 14 from a temperature and humidity transducer 50 on a line 52. Control system 48 also receives a signal representative of a flow of steam in power augmentation steam line 40 from a flow transducer 54 on a line 56.

A fuel valve 58 meters fuel to combustor 18 under control of a signal on a fuel control line 60 from control system 48. The amount of NOx reduction water injection into combustor 18 is controlled by a water control signal on a water control line 62 from control system 48. Flow-limiting valve 42 is controlled by a flow-control signal on a flow-control line 64.

Briefly, as long as the using process is capable of consuming the total process steam available on process steam line 36, NOx reduction water control valve 44 is controlled by the signal on water control line 62 to inject a flow of NOx reduction water into combustor 18 appropriate to produce the required NOx reduction for the fuel flow through fuel valve 58. When an excess of steam is available in process steam line 36, it is automatically valved into power augmentation steam line 40 by pressure controlled valve 38. Flow transducer 54, sensing the steam flow, transmits a signal representing this steam flow to control system 48. Control system 48 calculates the amount of the water in this steam flow which will reach the combustion zone of combustor 18 and reduces the water flow through NOx reduction water control valve 44 by a corresponding amount. Thus, the water, or water-equivalent of steam, injected into combustor 18 for NOx reduction remains at the predetermined level required to attain the desired amount of NOx reduction.

If the excess steam available in process steam line 36 becomes so great that the portion of such excess reaching combustion air line 16 for injection into the combustion zone of combustor 18 would exceed the maximum water limit, a signal on line 64 to flow-limiting valve 42 partially closes flow-limiting valve 42 to limit the steam flow in power augmentation steam line 40 to a value below that which exceeds the water injection requirements of combustor 18. If the amount of available process steam increases still further, the pressure in process steam line 36 may increase.

Figure 2:
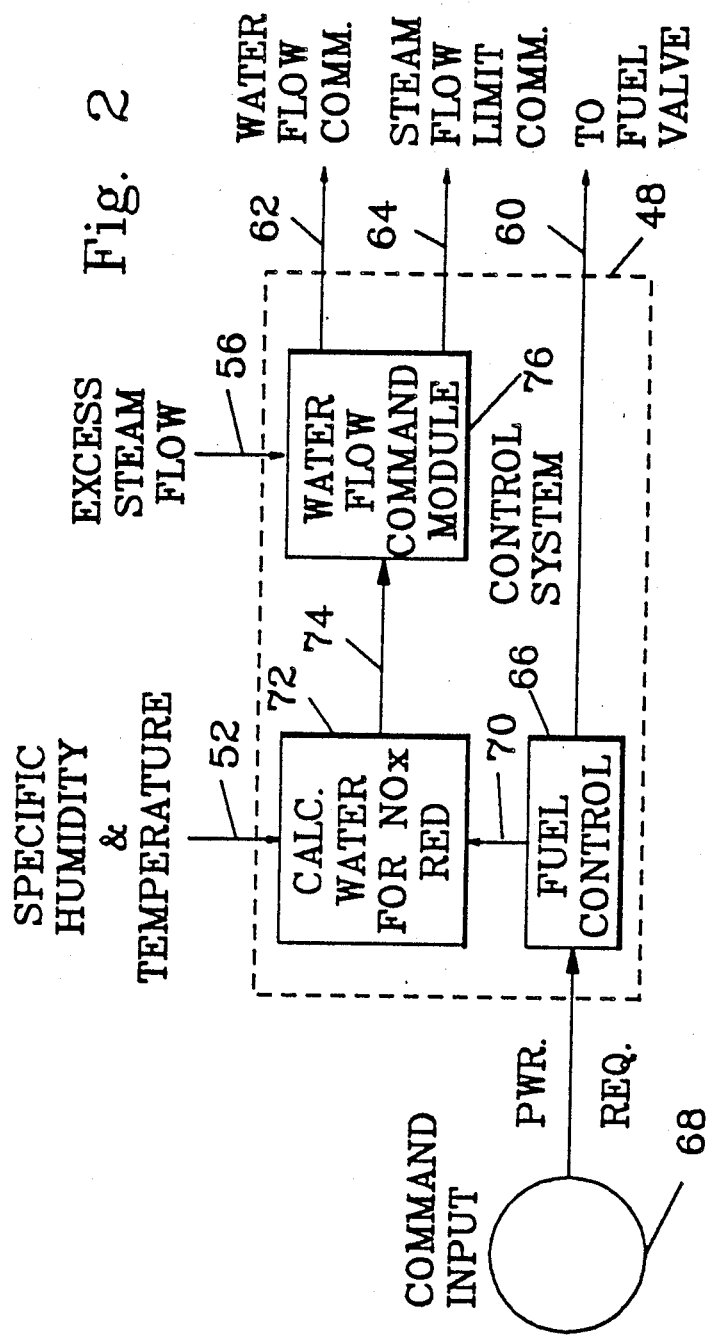
FIG. 2 is a block diagram of a control system of FIG. 1.

Referring now to FIG. 2, control system 48 includes a fuel control module 66 for calculating a fuel flow required to satisfy the power requirements of a command input 68. Fuel control module 66 produces a fuel control signal for application on fuel control line 60 to fuel valve 58 (FIG. 1). In addition, fuel control module 66 applies a signal proportional to fuel flow on a line 70 to a water-requirements calculator 72. Water-requirements calculator 72 also receives the temperature and specific humidity data on line 52. In response to its inputs, water-requirements calculator 72 applies a signal representing the total desired water injection into the combustion zone of combustor 18 required to maintain a desired level of NOx reduction for the existing level of fuel flow on a line 74 to a water flow command module 76. Water flow command module 76 also receives the flow signal on line 56 representing the total steam flow passing to air compressor 12 (FIG. 1).

As more steam flow is detected, water flow command module 76 reduces its water flow command in the proportion required to maintain the same effective quantity of water injection to the combustion zone of combustor 18. If the steam flow increases sufficiently to shut off the water flow completely, water flow command module 76 begins to produce a flow-limit signal on flow-control line 64 in order to hold the maximum steam flow to air compressor 12 at a value which does not overinject water, or water plus the water-equivalent steam, into combustor 18.

Figure 3:
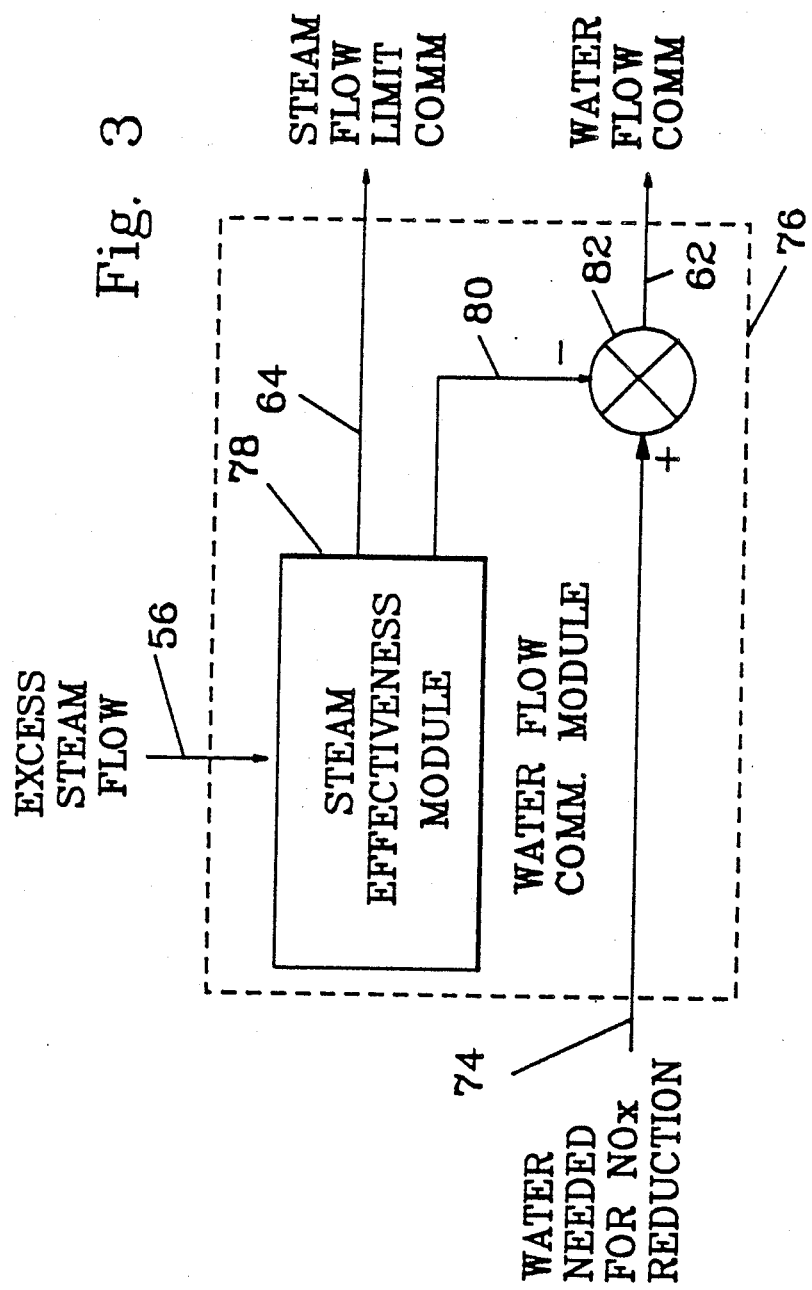
FIG. 3 is a block diagram of a water flow command module of FIG. 2.

Referring now to FIG. 3, water flow command module 76 contains a steam effectiveness module 78 which, based on the amount of excess steam flow, calculates the amount of water in the steam which will enter the combustion zone. For example, if the particular system is one in which one-third of the output of air compressor 12 enters the combustion zone of combustor 18, then an increase of one pound of steam flow per unit time requires a reduction of one-third of a pound of water flow per unit time. Steam effectiveness module 78 applies a signal representing the amount of water reduction required on a line 80 to a minus input of a subtractor 82. The total water requirements signal on line 74 is applied to the plus input of subtractor 82. A difference signal from subtractor 82, representing the amount of water which must be injected into combustor 18, is applied to water control line 62 for use as described.

Figure 4:
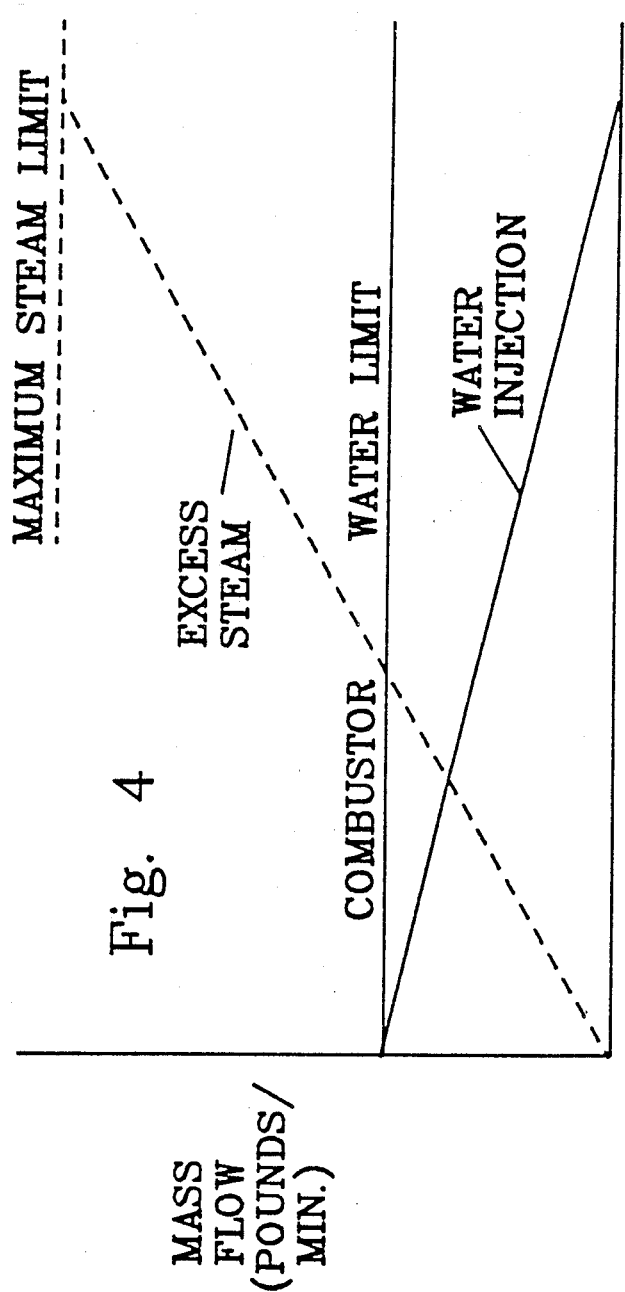
FIG. 4 is a set of curves to which reference will be made in describing the operation of the embodiment of the invention of FIGS. 1-3.

Referring to FIG. 4, the relationships between water injection and excess steam flows is shown. It will be noted that the positive slope of the excess steam flow curve is about three times as great as the negative slope of the water injection curve. This follows from the fact that only a fraction of the steam reaches the combustion zone of combustor 18. With the relationships shown, the amount of water entering the combustion zone remains at the selected combustion water limit.

Referring again momentarily to FIG. 1, although pressure controlled valve 38 and flow-limiting valve 42 are shown as separate units, in a further embodiment of the invention, flow-limiting valve 42 is omitted and the maximum steam flow in power augmentation steam line 40 is limited by a signal applied from control system 48 to pressure controlled valve 38 which adjusts the pressure threshold thereof upward a sufficient amount to limit the steam flow.

If the water injected into combustor 18 is not extremely pure, harmful chemical reactions and scale deposits may limit the useful life of the apparatus. Equipment to obtain the required level of water purity is expensive. Steam is inherently pure. Thus, steam is preferred for injection into the combustion zone, when it is available, in substitution for water.

Figure 5:
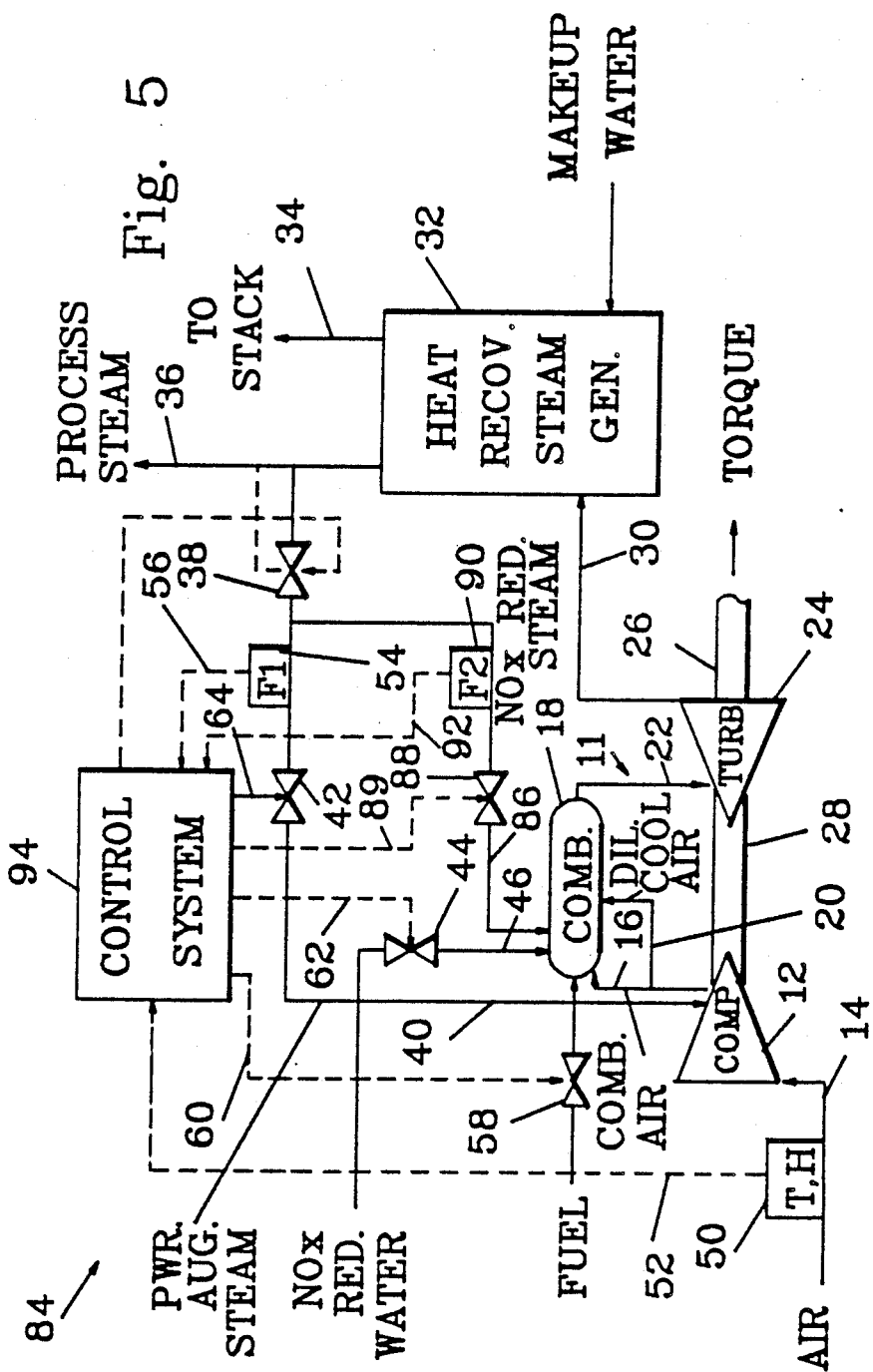
FIG. 5 is a simplified block and schematic diagram of a further embodiment of the invention.

Referring now to FIG. 5, a cogeneration system is shown, generally at 84, which substitutes excess steam for water injection when the steam is available. When more steam is available than is required to satisfy all of the requirements for NOx reduction, the additional steam is fed to the outlet of air compressor 12 for power augmentation. The injected steam must be reduced in the proper proportion as power augmentation steam is admitted to maintain the total steam flow into the combustion zone below a value which exceeds the maximum water limit of the combustor.

The principal difference between the embodiments of FIGS. 1 and 5 is seen in the addition of a NOx reduction steam line 86 leading to the combustion zone of combustor 18 and a control valve 88 responsive to a signal on a line 89 for controlling the amount of steam flowing therein. A flow transducer 90 feeds a signal representing the steam flow in NOx reduction steam line 86 on a line 92 to a control system 94. As in the prior embodiment, flow transducer 54 feeds a signal representing steam flow in power augmentation steam line 40 on line 56 to control system 94.

In the prior embodiment, flow-limiting valve 42 served the relatively passive function of permitting all of the excess steam to flow therethrough until a maximum limit is reached. The embodiment of FIG. 5 requires active control of flow-limiting valve 42 and control valve 88 for proportioning steam flow in a predetermined manner between power augmentation steam line 40 and NOx reduction steam line 86.

Figure 6:
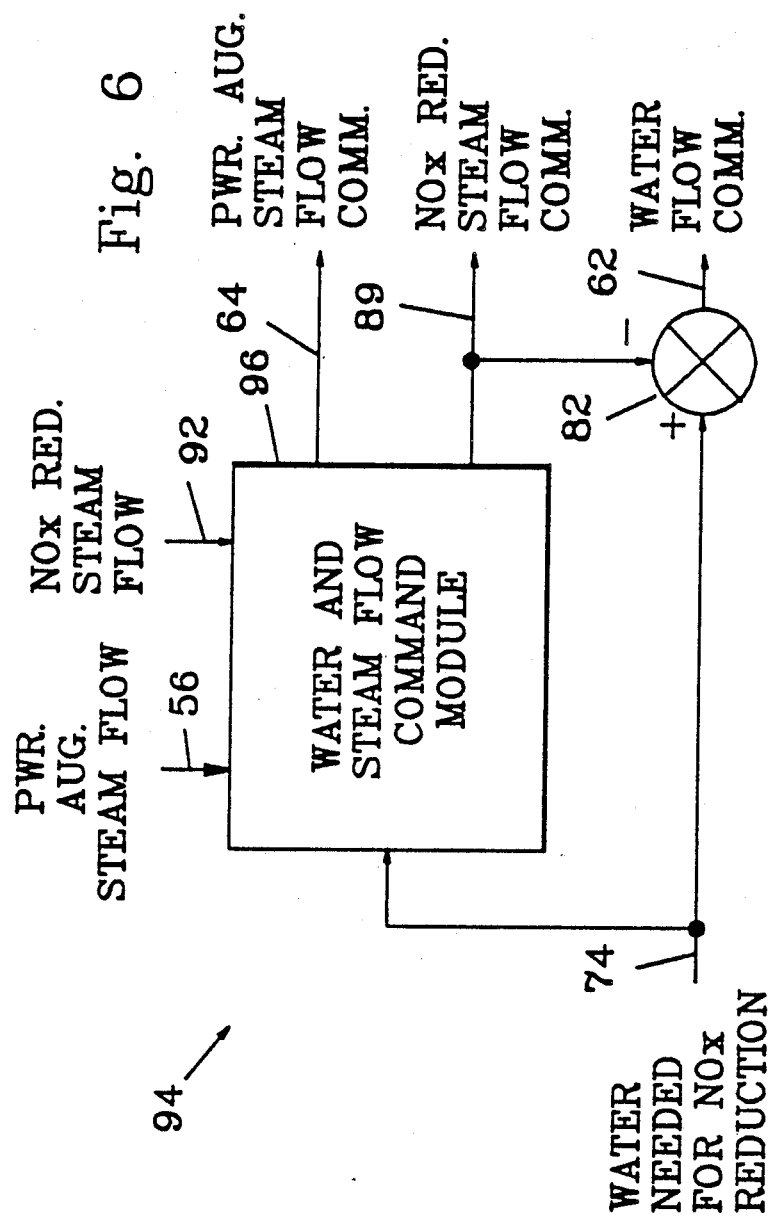
FIG. 6 is a block diagram of a portion of a control system of FIG. 5.

FIG. 6 shows the changed portion of control system 94. The two steam flow signals on lines 56 and 92 are applied to a water and steam flow command module 96 along with a signal on line 74 indicating the amount of water injection required. A NOx reduction steam flow command is applied to line 89 and to a minus input of subtractor 82. The water-requirement command is applied to a plus input of subtractor 82. As the NOx reduction steam flow command on line 89 increases, its value is subtracted from the water flow command on line 74 to produce the resultant water flow command on water control line 62 which controls NOx reduction water control valve 44 (FIG. 5).

Referring now also to FIG. 5, when the available excess steam is sufficient to drive the water flow command on water control line 62 to zero, additional excess steam is valved through flow-limiting valve 42 to air compressor 12 where it mixes with the compressed air for power augmentation. The amount of steam flowing through NOx reduction steam line 86 must be proportionately reduced to maintain the total steam flow to the combustion zone at a value which produces the desired level of NOx reduction.

Figure 7:
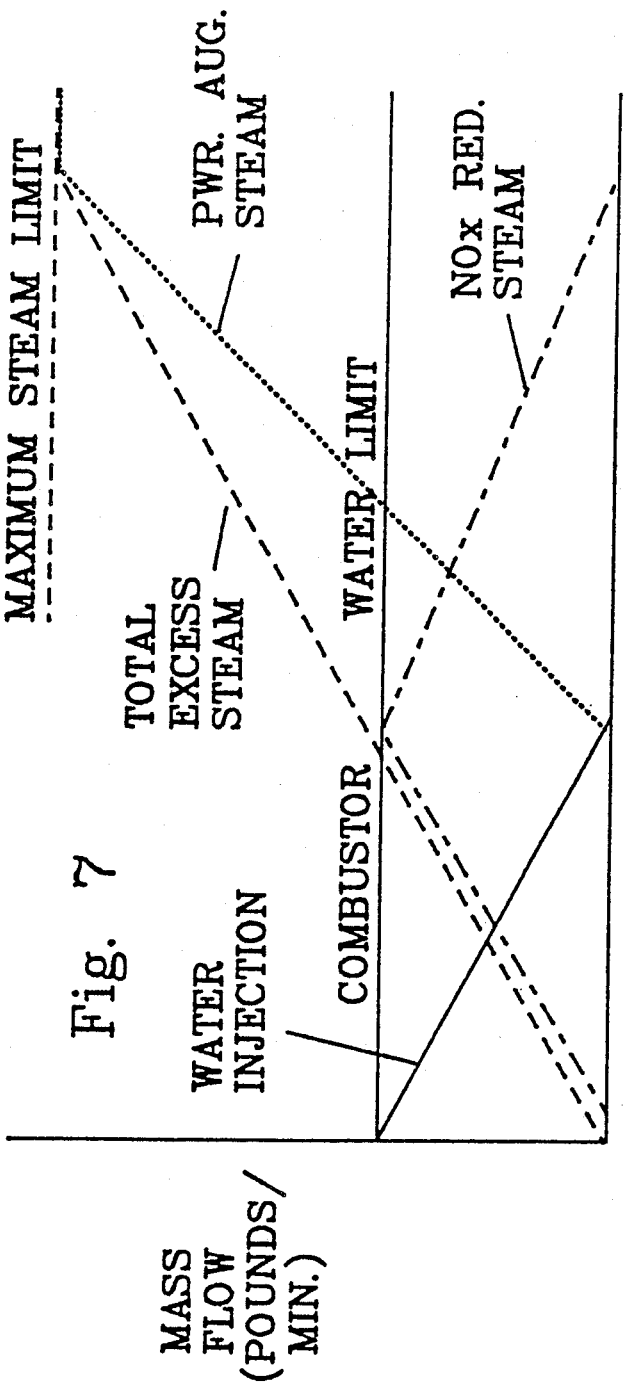
FIG. 7 is a set of curves to which reference will be made in describing the embodiment of the invention of FIGS. 5 and 6.

Referring now to FIG. 7, the water and steam flow relationships are shown. As excess steam, indicated by a dashed line, becomes available, each increment of excess steam fed to combustor 18 for NOx reduction, indicated by a dot-dash line, is matched by a corresponding decrease in water flow, indicated by a solid line. When the excess steam flow (and NOx reduction steam flow) reaches the combustor water limit, water flow is cut off and power augmentation steam flow, indicated by a dotted line, begins with a proportional reduction in NOx reduction steam flow. The maximum steam limit, indicated by a horizontal dashed line, is reached by the power augmentation steam flow at the same time that the NOx reduction steam flow reaches zero. Thereafter, the power augmentation steam flow is limited to this maximum steam limit regardless of the availability of additional excess steam.

The foregoing system can be implemented using any convenient technology. Control systems 48 and 94, in particular, may be automatic, semi-automatic or manually aided systems. For example, the amount of water injection required may be determined by a human operator reading an existing fuel flow measurement and looking up a corresponding water flow required to attain the desired level of NOx reduction in a table or plotted curve. The operator may then manually open a water control valve to admit the required amount of water. In a similar manner, the operator may monitor the flow of excess steam and use a table or curve to determine a reduced value for water flow. The operator accordingly may then adjust the water flow. In the preferred embodiment, the relationships between fuel flow, water injection and the one or two steam flows are contained in a digital memory as tables or mathematical functions. The calculations are performed by a digital computer, preferably a microprocessor. Suitable conventional analog-to-digital and digital-to-analog conversion apparatus are required to convert analog signals to digital and vice versa.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A cogeneration system comprising:
   a gas turbine having an air compressor, a combustor and a turbine effective for producing an output torque and a flow of hot gasses;
   a heat recovery steam generator effective for absorbing heat energy from said flow of hot gasses and for producing steam;
   means for injecting at least one of a steam and a water into a combustion zone of said combustor at a flow effective for producing a predetermined level of reduction in a NOx in said flow of hot gasses;
   means for adding at least a part of an excess steam from said heat recovery steam generator to a compressed air from said air compressor whereby power output of said gas turbine is augmented; and
   means for reducing said at least one of a steam and a water in a proportion to said excess steam added to said compressed air effective to maintain said predetermined level of reduction in a NOx in said flow of hot gasses.

2. A cogeneration system according to claim 1 wherein said at least one of a steam and a water includes a steam and a water in a flow which, together, is effective for producing said predetermined level of reduction in a NOx.

3. A cogeneration system according to claim 2 wherein said system further includes means for first substituting said excess steam for said water and simultaneously reducing said water in proportion to said excess steam until said excess steam is sufficient to maintain said predetermined level of reduction in a NOx without requiring said water.

4. A cogeneration system according to claim 3 wherein said means for adding at least a part of an excess steam to said compressed air is effective only after said excess steam is at least sufficient to maintain said predetermined level of reduction in a NOx without requiring said water.

5. A cogeneration system according to claim 1 further comprising means for limiting a flow of said excess steam added to said compressed air to a value which does not exceed an amount required for maintaining said predetermined level of reduction in a NOx.

6. A method for controlling a cogeneration system of a type including a gas turbine and a heat recovery steam generator, said gas turbine including an air compressor, a combustor and a turbine effective, in combination, for producing a torque, and a quantity of hot gasses, said heat recovery steam generator being effective to absorb heat energy from said quantity of hot gasses for producing steam, the method comprising:

injecting at least one of a steam and a water into a combustion zone of said combustor at a flow effective for producing a predetermined level of reduction in a NOx in said quantity of hot gasses;

adding at least part of an excess steam from said heat recovery steam generator to compressed air from said air compressor whereby power output of said gas turbine is augmented; and reducing said at least one of a steam and a water in a proportion to said excess steam added to said compressed air effective to maintain said predetermined level of reduction in a NOx in said quantity of hot gasses.

* * * * *